March 14, 1944.                R. T. ADAMS                2,344,340
              APPARATUS FOR APPLYING TAPE UPON ARTICLES
                    Filed May 29, 1942           2 Sheets-Sheet 1
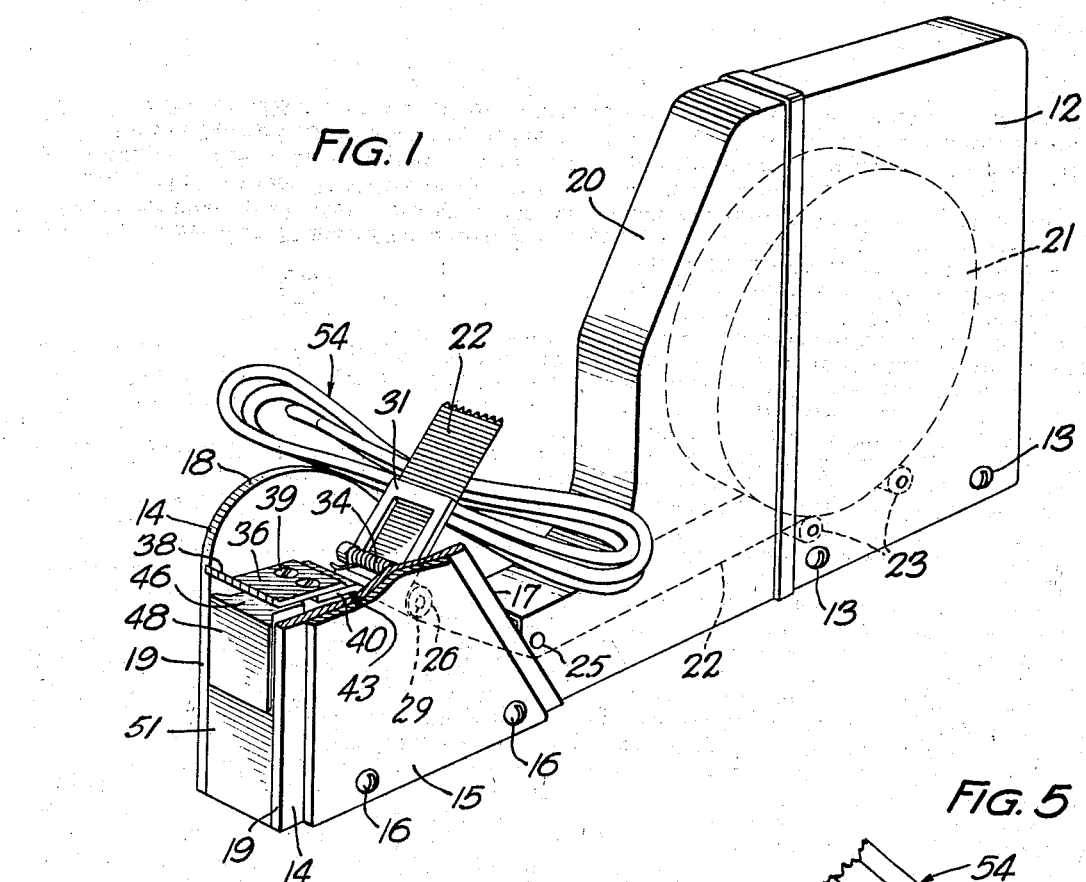
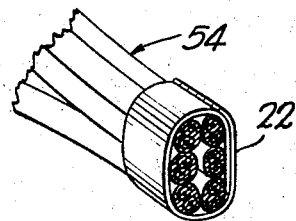
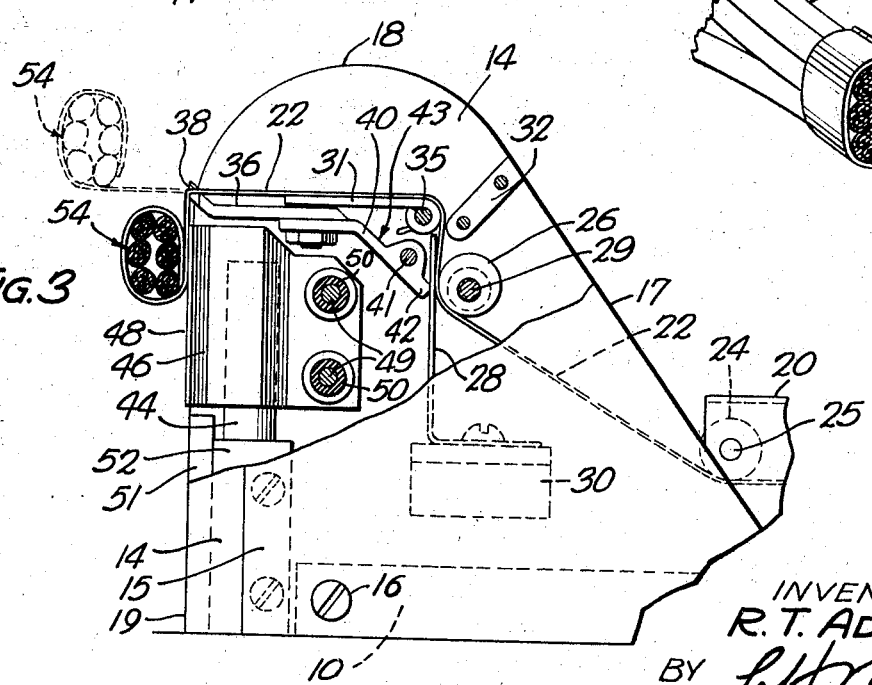
INVENTOR
R. T. ADAMS
BY
ATTORNEY

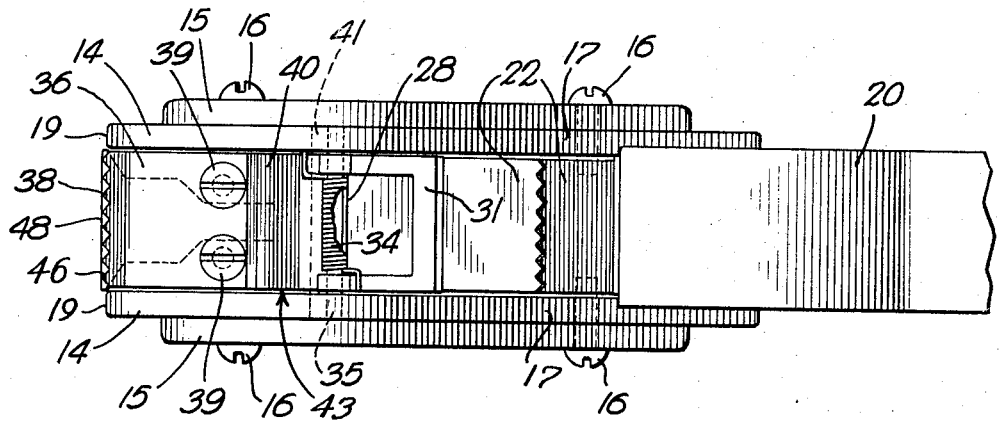

Patented Mar. 14, 1944

2,344,340

UNITED STATES PATENT OFFICE 2,344,340

APPARATUS FOR APPLYING TAPE UPON ARTICLES

Robert T. Adams, Baltimore, Md., assignor to Western Electric Company, Incorporated, New York, N. Y., a corporation of New York Application May 29, 1942, Serial No. 445,094

20 Claims. (Cl. 216—33)

This invention relates to apparatus for applying tape upon articles and more particularly to apparatus for applying a heat-sealing tape upon articles.

Most manually operated tape applying devices require the operator to rotate the article in order to wind the tape about it. This rotary motion is slow and tires the operator, especially in the case of heat-sealing tape, which has to be held in position until sealed by pressing it against some heated surface.

An object of this invention is to provide new and improved apparatus for applying tape upon articles.

One apparatus embodying the invention comprises means for supplying tape, means for guiding the tape to a point where it may be readily applied to an article, and a member against which the tape may be pressed to cause it to adhere.

Other objects and features of the invention will become apparent from the following detailed description when read in conjunction with the following drawings, in which Fig. 1 is a perspective view of an apparatus for applying heat-sealing tape with a portion thereof broken away;

Fig. 2 is an enlarged longitudinal vertical sectional view of a portion of the apparatus shown in Fig. 1;

Fig. 3 is an enlarged fragmentary view of the apparatus shown in Fig. 1 with a portion thereof broken away;

Fig. 4 is an enlarged top plan view of a portion of the apparatus shown in Fig. 1, and Fig. 5 is a fragmentary view of a bundle sealed with tape.

In the particular embodiment of the invention disclosed in the accompanying drawings, a channel bar 10 is fastened to a support 11, such as a work bench or the like. A metal housing 12 (Fig. 2) is bolted to one end of the channel bar 10 by bolts 13—13 (Fig. 1), while a pair of side walls 14—14 covered by cover plates 15—15 are bolted by bolts 16—16 to either side of the opposite end of the channel bar 10. The side walls 14—14 and the cover plates 15—15 are preferably composed of insulating material such as phenol fibre, but may be made of any suitable material. Each side wall has an inclined edge 17, an arcuately shaped top edge 18, and a vertical edge 19. A removable shield 20 is positioned over the channel bar 10 between the metal housing 12 and the side walls 14—14.

A roll 21 (Fig. 1) of a heat-sealing tape 22 is mounted on rollers 23—23 disposed within the housing 12. The tape 22 is drawn off the roll 21 under a guide roll 24 (Fig. 2) rotating about a pin 25 set in the shield 20, and passes between a stationary, eccentrically mounted circular guide member 26 and a flat tension spring 28. A screw 29 passes through one of the side walls 14—14 and adjustably supports the guide member 26. A U-shaped support 30 to which the tension spring 28 is affixed, is secured to the side walls 14—14. As the tape 22 passes over the guide member 26, the tension spring 28 presses against the tape with sufficient force to exert tension upon the tape as it is applied to an article to be wrapped to provide a tighter and more secure wrap.

Since the circular guide member 26 is eccentrically and adjustably mounted, its position may be changed so that the guiding surface thereof nearest the tension spring 28 is at the proper position to cause the tension spring to exert the desired amount of pressure upon a tape passing between the guide member 26 and the tension spring. This adjustment may be made easily by loosening the screw 29, rotating the guide member 26 to the desired position and then tightening the screw.

The tape 22 is drawn over the guide member 26 and up past a spring pressed frame 31, which is resiliently urged toward a stop 32 by a spring 34 wound about a pin 35 upon which the spring pressed member rotates. A tape severing blade 36 having a serrated cutting edge 38 (Fig. 4) is fastened by means of screws 39—39 to a bent arm 40 formed on a lever 43, which is pivoted about a pin 41, and a shorter arm 42 is formed on the opposite end of the lever 43.

The combined weights of the blade 36 and arm 40 tend to rotate the lever 43 in a counter clockwise direction, as seen in Figs. 2 and 3, and thereby cause the arm 42 to rest lightly against the tension spring 28. Consequently, the position of the blade 36 and of its cutting edge 38 may be adjusted by adjusting the position of the tension spring 28 by means of the eccentrically mounted guide member 26, as previously described. It is desirable to position the cutting edge 38 as low as possible in order to shorten the length of tape severed at the completion of the sealing operation.

When the tape 22 is pressed downwardly against the cutting edge 38 of the blade 36, the arm 40 rotates about the pin 41 in a counter clockwise direction as seen in Figs. 2 and 3 so as to force the arm 42 against the tension spring 28. As a result, the latter forces the tape 22 toward the guide member 26 and prevents movement of a tape 22 positioned between the guide member and the tension spring.

A heating element 44 is supplied with electricity by leads 45—45 (Fig. 2) which pass through an opening 47 in the support 11 and are connected to a power source. A tape sealing shoe 46 fits over and is heated by the heating element 44. The shoe 46 has a smooth surface 48 against which the heat-sealing tape may be pressed to make it adhesive. Two screws 49—49 about which corrugated insulating sleeves 50—50 are fitted, support the shoe 46 so as to convey very little heat from the shoe to the rest of the apparatus. A heel plate 51 of insulating material is secured to a heater mounting block 52 below the surface 48 of the heated shoe and near the vertical edges 19—19 of the side walls.

In the operation of the device an operator places an article 54 to which the tape 22 is to be applied near the lower portion of the inclined edges 17—17 of the side walls 14—14 as shown in Fig. 1. In the particular embodiment of the invention disclosed in the drawings, the article to which the tape is to be applied is a bundle composed of a folded telephone cord.

The operator pulls the article 54 forward, keeping it in contact with the inclined edges 17—17, until it contacts the tape 22, as shown in Fig. 2. The tape 22 is then bent downwardly over the article 54 as shown in dotted lines in Fig. 2, and held there by the operator while the article is advanced upwardly and forwardly along the inclined edges 17—17 and over the arcuately shaped edges 18—18. The frame 31 is rotated by this movement of the tape into the position shown in dotted lines in Fig. 2. While the article is being moved in this manner, the tape 22 is being withdrawn from the roll 21, under the guide roll 24, between the guide member 26 and the tension spring 28, past the spring pressed frame 31 and around the article. The continual pressure of the spring 28 against the tape as it passes over the guide roll 26 maintains a constant tension upon the tape drawn therebetween and makes it easier to handle.

When the article has advanced along the edges 18—18 of the side walls 14—14 almost to the vertical edges 19—19, the operator continues to draw the article outwardly until it reaches the position shown in dotted lines in Fig. 3. When the article reaches this position, the tape 22 contacts the cutting edge 38 of the blade 36, and exerts sufficient downward pressure against the cutting edge 38 to cause the arm 40 to rotate and thereby force the arm 42 against the tension spring 28. As a result, the pressure of the spring 28 against the tape 22 passing over the guide member 26 is increased sufficiently to prevent movement of the tape beyond this point.

As soon as the feeding of the tape is stopped in this manner, the operator swings the article 54 downwardly against the heated surface 48 of the shoe 46, as shown in full lines in Fig. 3, and seals the tape on the article. A short downward movement of the article severs the tape and permits the spring pressed frame 31 to return to its normal position against the stop 32, carrying with it the end of the tape 22. At the same time, the pressure is removed from the blade 36 and the arm 42 no longer forces the spring 28 against the tape 22 passing over the guide member 26, so that the tape 22 is once more free to be drawn between the guide member 26 and the tension spring 28. In this manner, the tape 22 is made ready for application to the next article immediately after the tape applied to the previously taped article is cut.

It is important to note in connection with this apparatus that the operator need not rotate the article to which the tape is applied but merely rotate the article about a point from which the tape is fed. As a result, the tape may be applied to the articles several times as fast as devices requiring rotation of the articles by the operators, and is considerably less fatiguing to the operators.

The tape for which this apparatus is especially suited is the type known as heat-sealing tape. This tape has a thin layer of a thermoplastic substance on one side thereof, so that the tape may be sealed by heating a portion of the tape to temporarily melt the thermoplastic material and cause it to adhere to an adjacent layer of tape or to an article. Such tape is a commercial product and the tape itself does not constitute a part of this invention.

What is claimed is:

1. Apparatus for applying a heat-sealing tape upon articles, which comprises means for supplying such a tape, means for guiding the tape from the supplying means to a position where it may readily be applied to an article, a combined tape tearing arm and detent adjacent to the tape applying position, and a heated member adjacent to the tearing arm against which member the tape may be pressed to seal it, said tape tearing arm being adapted to be engaged by the tape to tear the tape and being movable during the tearing operation to cause the detent to prevent movement of the tape through the guide means during that operation.

2. Apparatus for applying a heat-sealing tape upon articles, which comprises a housing for holding a roll of such a tape, means for guiding a tape withdrawn from a roll held in the housing, a flat tension spring which presses lightly against the tape as it passes through the guiding means, a heated member against which the tape may be pressed to seal it, a pivotally mounted lever positioned between the guide and the heated member and having on one end a tape severing edge adapted to be engaged by the tape and on the other end an arm so positioned with respect to the tension spring that downward pressure upon the tape causes the severing edge to force the arm against the tension spring to prevent movement of the tape through the guide means during the tape severing operation, and means for guiding the movement of the article while the tape is being applied thereto.

3. Apparatus for applying a heat-sealing tape upon articles, which comprises means for supplying such tape, means for guiding a tape withdrawn from the tape supplying means, a spring pressed member which tends to maintain the tape that is passed through the tape guiding means in one position, means against which the tape may be pressed for tearing the tape, and a heated member positioned adjacent to the tearing means against which member the tape may be pressed to become adhesive.

4. Apparatus for applying a heat-sealing tape upon articles, which comprises a housing for holding a roll of such a tape, a plurality of guide members, a spring pressed member which tends to keep a tape that is passed over the guide members in one position, a combined tape tearing means against which the tape may be pressed for severing the tape and detent for pressing the tape against one of the guide members to prevent movement of the tape during the tearing operation, a heated member positioned adjacent to the tearing means against which member the tape may be pressed to seal it after the tearing operation, and means for guiding the movement of an article in an arcuate path while the tape is being applied thereto.

5. Apparatus for applying a heat-sealing tape upon articles, which comprises a housing for holding a roll of such a tape, a guide member, a spring pressed member which tends to keep the tape that is passed over the guide member in one position, a detent for intermittently preventing the movement of the tape over the guide member, and a heated member positioned adjacent to the detent against which heated member the tape may be pressed to seal it.

6. Apparatus for applying a heat-sealing tape upon articles, which comprises means for supplying such a tape, means for guiding a tape withdrawn from the tape supplying means, a spring member which presses against the tape passing through the tape guiding means, a tape tearing member against which the tape may be pressed, and a heated member positioned adjacent to the tearing member against which heated member the tape may be pressed to seal it.

7. Apparatus for applying a heat-sealing tape upon articles, which comprises a housing for holding a roll of such a tape, a member for guiding the tape, a spring which presses lightly against a tape drawn from the roll as it passes over the guide member, a spring pressed member which tends to keep the tape that has passed over the guide member in one position, a combined tape tearing means and detent for cooperating with the guide member to prevent movement of the tape over the guide member during the tape tearing operation, and a heated member positioned adjacent to the tearing means against which heated member the tape may be pressed to seal it.

8. Apparatus for applying a heat-sealing tape upon articles, which comprises a housing for holding a roll of such a tape, a member for guiding the tape, a flat tension spring which presses lightly against the tape as it passes over the guide member, a spring pressed member which tends to maintain the tape which has passed over the guide member in one position, a pivotally mounted lever having on one end a tape severing edge against which the tape may be pressed to sever the tape and on the other end an arm so positioned with respect to the tension spring that when the tape is pressed against the tape severing edge the arm is forced against the tension spring to prevent movement of the tape over the guide member against which the tension spring presses, a heated member positioned adjacent to the severing edge against which heated member the tape may be pressed to render it adhesive, and means for guiding the movement of the article in an arcuate path while the tape is being applied thereto.

9. Apparatus for applying tape upon articles which comprises means for supplying a tape, means for guiding the tape withdrawn from the tape supplying means to a position where it may be readily applied to an article, means for guiding the article in an arcuate path about the position to which the tape is supplied, and means adjacent to said position for severing the tape.

10. Apparatus for applying tape around articles, which comprises means for holding a supply of tape, means for guiding an article to which tape is to be applied along an arcuate path, means for guiding a tape drawn from the tape supply to a point adjacent to one end of the article guiding means, and means adjacent to the opposite end of the article guiding means against which the tape may be pressed for sealing the tape.

11. Apparatus for applying tape around an article, which comprises means for holding a supply of tape, a pair of members having arcuate guiding surfaces for guiding an article to which tape is to be applied in an arcuate path, means for guiding a tape drawn from the tape supply to a point adjacent to one end of the arcuate guiding surfaces, and a combined tape tearing means and detent adjacent to the other end of the arcuate guiding surfaces, whereby movement of the tape is stopped while the tape is being torn.

12. Apparatus for applying tape around an article, which comprises means for holding a supply of tape, means for guiding an article to which tape is to be applied along an arcuate path, means for guiding a tape drawn from the tape supply to a point adjacent to the article guiding means, a spring pressed member for normally holding the end of tape adjacent to one end of the arcuate guiding means, and means adjacent to the opposite end of the article guiding means for severing the tape when the tape is pressed thereagainst, said spring-pressed member yielding as the tape is wrapped around an article but returning the free end of the tape to its normal position after the tape has been severed.

13. Apparatus for applying tape around an article, which comprises a housing for holding a roll of tape, means for guiding an article to which tape is to be applied along an arcuate path, means for guiding the tape to a point adjacent to one end of the article guiding means, a detent for pressing the tape against the guiding means and having a tape severing edge for severing the tape which is adjacent to the opposite end of the article guiding means, and a member positioned adjacent to the severing edge against which member the tape may be pressed to seal it.

14. Apparatus for applying tape around an article, which comprises a housing for holding a roll of tape, means for guiding an article to which tape is to be applied along an arcuate path, means for guiding the tape to a point adjacent to one end of the article guiding means, a tension spring cooperating with the guide means for tensioning the tape as it is withdrawn from the tape guiding means, a combined tape tearing means against which tearing means the tape may be pressed and detent engaging the tension spring when the tape is pressed against the tearing means to prevent movement of the tape during the tearing operation, and a member positioned adjacent to the tearing means against which member the tape may be pressed to seal it.

15. Apparatus for applying tape around an article, which comprises a housing for holding a roll of tape, means for guiding an article to which tape is to be applied along an arcuate path, means for guiding the tape drawn from the roll to a point adjacent to one end of the article guiding means, a tension spring cooperating with the guide means for tensioning the tape as it is withdrawn from the tape guiding means, a spring pressed member for normally holding the end of the tape adjacent to one end of the arcuate guiding means, means against which the tape may be pressed to sever the tape and which is positioned adjacent to the opposite end of the article guiding means, and a member positioned adjacent to the severing means against which member the tape may be pressed to seal it around the article.

16. Apparatus for applying tape upon articles, which comprises a housing for holding a roll of tape, a member for guiding tape drawn from the roll, a tension spring pressing against the tape as it passes over the guide member, a spring pressed member for positioning the tape for application to an article, means for guiding the article to which the tape is applied in an arcuate path about the point from which the tape is supplied to the article, means for sealing the tape, and a combined tape tearing means and detent positioned adjacent to the sealing means for pressing the spring against the tape and thereby preventing movement of the tape during the tearing operation.

17. Apparatus for applying a heat-sealing tape upon articles, which comprises a base, a pair of side walls having article-guiding surfaces thereon secured to the base, a housing for a roll of tape adjacent to the side walls, a guide secured upon and between the walls for guiding a tape to one end of the article-guiding surfaces, and a lever pivoted between the walls having a severing edge on one end thereof against which the tape may be pressed for severing the tape and a detent on the other end thereof for pressing the tape against the guide to stop the movement of the tape during the tape-severing operation.

18. Apparatus for applying a heat-sealing tape upon articles, which comprises a base, a pair of side walls having article-guiding surfaces thereon secured to the base, a housing for a roll of tape adjacent to the side walls, a guide secured upon and between the walls for guiding a tape to one end of the article-guiding surfaces, a lever pivoted between the walls having a severing edge on one end thereof against which the tape may be pressed for severing the tape and a detent on the other end thereof for pressing the tape against the guide to stop the movement of the tape during the tape-severing operation, and a heated member positioned below the severing edge against which the tape may be pressed for sealing it.

19. Apparatus for applying a heat-sealing tape upon articles, which comprises a base, a housing secured to the base for holding a roll of heat-sealing tape, a pair of sides secured to the base and having arcuate, article-guiding surfaces formed thereon, a guide secured between the sides around which the tape may be drawn as it is applied to articles, a spring for pressing the tape against the guide, a spring-pressed frame tending to keep the tape adjacent to one end of the article-engaging surfaces, and a pivotally mounted lever having a severing edge formed on one end thereof adjacent to the other end of the article-guiding surfaces for severing the tape when the tape is pressed thereagainst and having a detent formed on the other end thereof for pressing the tape between the spring and the first-mentioned guide during the tape-tearing operation to prevent movement of the tape therebetween during that operation.

20. Apparatus for applying a heat-sealing tape upon articles, which comprises a base, a housing secured to the base for holding a roll of heat-sealing tape, a pair of sides secured to the base and having arcuate, article-guiding surfaces formed thereon, a guide secured between the sides around which the tape may be drawn as it is applied to articles, a spring for pressing the tape against the guide, a spring-pressed frame tending to keep the free end of the tape adjacent to the one end of the article-guiding surfaces, a lever pivotally mounted between the article-guiding surfaces having a severing edge formed on one end thereof adjacent to the other end of the article-guiding surfaces for severing the tape when the tape is pressed thereagainst and having a detent formed on the other end thereof for pressing the tape between the spring and the guide during the tape-tearing operation to prevent movement of the tape therebetween during that operation, and a heated member positioned adjacent to the severing edge against which member the tape may be applied to seal it to the article.

ROBERT T. ADAMS.